May 26, 1970

C. P. RONDEN 3,513,504

EXTRUSION DIE

Filed March 28, 1968

INVENTOR

CLIFFORD P. RONDEN

BY Arnold & Raylance

ATTORNEYS

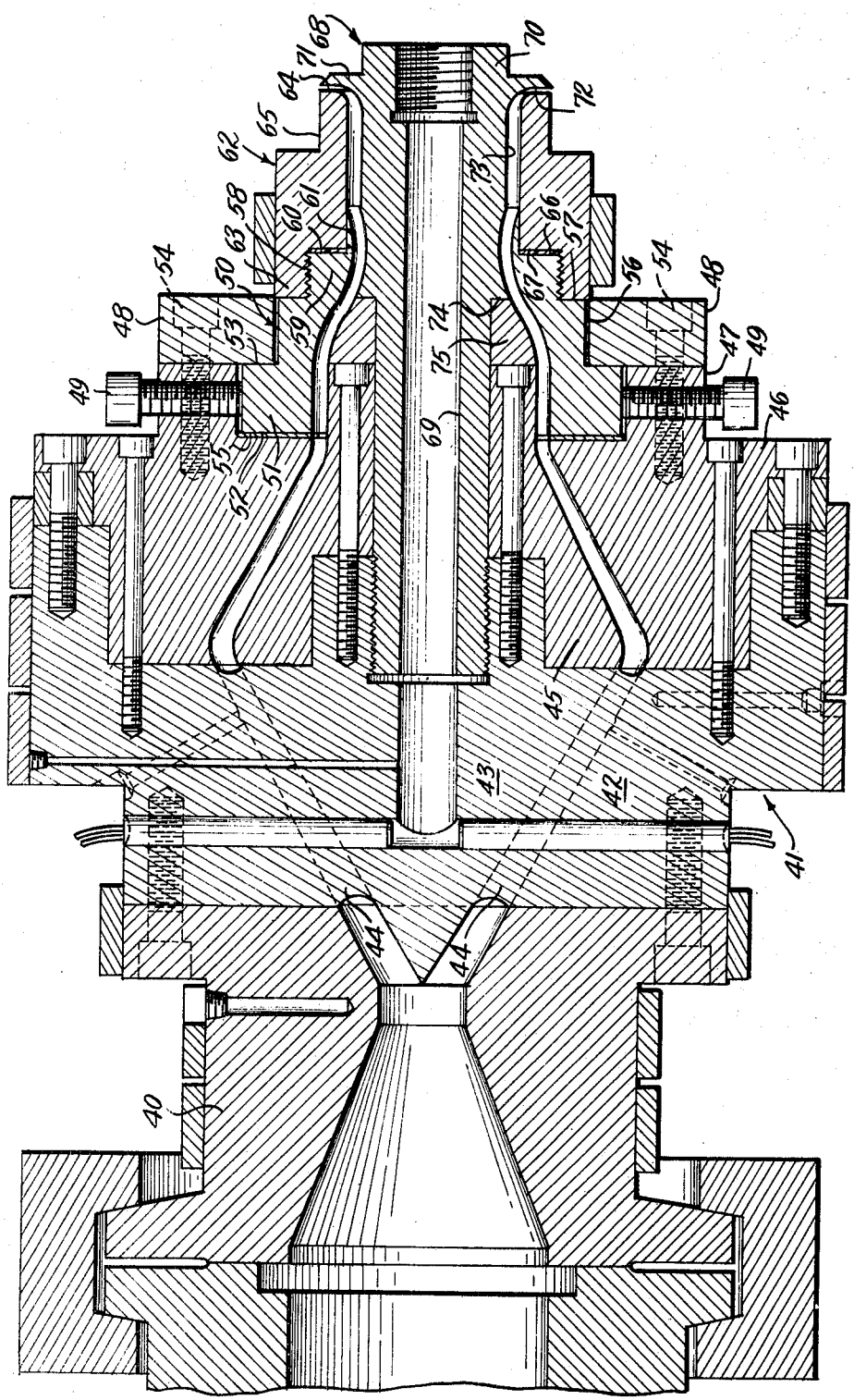

United States Patent Office 3,513,504
Patented May 26, 1970

3,513,504
EXTRUSION DIE
Clifford P. Ronden, Edmonton, Alberta, Canada, assignor to Cupples Container Company, Austin, Tex., a corporation of Missouri
Continuation-in-part of application Ser. No. 582,946, Sept. 29, 1966. This application Mar. 28, 1968, Ser. No. 718,311
Int. Cl. B29d 23/04; B29f 3/04
U.S. Cl. 18—14                                    2 Claims

ABSTRACT OF THE DISCLOSURE

Die structure, for extrusion of thermoplastic polymeric sheet, characterized by having an annular orifice which opens peripherally, rather than axially, with adjustment of the die gap being accomplished by rotation of a screw-thread-supported annular die body member which presents one of the die lip surfaces.

---

This application is a continuation-in-part of my copending application Ser. No. 582,946, filed Sept. 29, 1966, now abandoned.

This invention relates to the production of sheet by extrusion from thermoplastic polymeric material and, more particularly, to an improved tubular extrusion die.

Thermoplastic polymeric materials are conventionally formed into sheet by establishing a confined mass of molten or heat-plastified polymeric material, extruding the material continuously through an annular die orifice defined by concentrically spaced surfaces which are generally cylindrical in nature and centered on an axis extending in the direction of extrusion, carrying the resulting tubular product away from the die and closing the tubular product, as by means of flattening belts, at a point spaced from the die, inflating the extruded tubular product by supplying a fluid under pressure to the interior of the tubular product between the die and the point of closing the tubular product, slitting the tubular product as it is moved away from the point of closing, and converting the product to at least one flat running web. This general procedure is typically shown in U.S. Pats. 3,121,911, issued Feb. 25, 1964, to G. E. Lightner; 3,160,918, issued Dec. 16, 1964, to L. J. Berggren et al.; 3,231,642, issued Jan. 25, 1966, to M. Goldman et al.; and 3,248,462, issued Apr. 26, 1966, to E. E. Merrill et al.

The step of inflating the extruded tubular product, usually to at least several times the diameter of the die orifice, may be carried out simply to obtain sheet of the desired width or also to attain biaxial orientation in the product so that the strength in the transverse direction will approximate the strength in the longitudinal direction. Since the extruded material is still plastic adjacent the die, the inflating step causes the sheet to be stretched generally transversely to an extent depending upon the difference between the diameter of the die orifice and that of the inflated tubular product. Though this procedure has been generally successful, it has caused a severe problem because, being inflated, the extruded tubular product is forced against the lip presented at the die orifice by the die body, so that irregularities are formed in the outer surface of the tubular product. Such surface irregularities are highly objectionable, particularly when producing sheet material from which products are to be made by thermoforming.

The problem of avoiding such surface irregularities is particularly severe when the material being extruded is a foamable thermoplastic. In that event, the material foams as it emerges from the die orifice and, in foaming, becomes markedly thicker. Even though the extruded product is drawn away from the die at such a rate that the still-plastic material is stretched, so that there is a tendency for the thickness thereof to be correspondingly reduced, the foaming action still increases the contact between the extruded product and the outer die lip. Additionally, the surfaces of an extruded foamed product are inherently less smooth and less tenacious than those of an unfoamed product, so that the danger of forming surface irregularities is markedly greater with the foamed product.

In an effort to solve the foregoing difficulties, it has been proposed to employ a die in which the orifice opens peripherally, rather than axially, so that the surfaces which define the orifice lie in transverse planes. Such dies are disclosed, for example, in U.S. Pats. 2,769,200, issued Nov. 6, 1956, to M. O. Longstretch et al.; 2,952,872, issued Sept. 20, 1960, to R. H. B. Buteau et al.; and 3,079,636, issued Mar. 5, 1963, to A. A. Aykanian. While such dies are distinctly superior to those wherein the orifice opens axially, they have presented a severe problem in actual use because of the difficulty in providing for adjustment of the die gap preparatory to starting extrusion and, particularly, while extrusion is being carried out.

A general object if the invention is accordingly to provide such a die wherein the die gap can be adjusted easily and accurately.

Another object is to devise a peripheral orifice extrusion die in which the orifice is defined by separate die members so arranged and supported that adjustment of the die gap can be made by turning a single die member.

Dies in accordance with the invention comprise a die body member having a through passage, a transverse annular front end surface, and a threaded circular surface portion spaced rearwardly from the front end surface, a fixed member having a threaded circular surface mating with the threaded surface on the die body member so as to mount the die body member and provide for axial adjustment of the same, and mandrel means including a transversely enlarged nose portion defining a fixed die lip surface disposed adjacent the front end surface of the die body member so that the two adjacent surfaces define the die orifice, rotation of the die body member relative to the fixed member serving to move the front end surface toward and away from the fixed die lip (depending upon the direction of rotation) so as to adjust the die gap. Advantageously, the mandrel means includes an elongated mandrel body supported by threaded engagement with a core or torpedo member at the end of the mandrel body opposite the nose portion, so that the mandrel means, and therefore the fixed die lip, can be shifted axially by rotation of the mandrel body for coarse adjustment of the die gap.

In order that the manner in which the foregoing and other objects are attained in accordance with the invention can be understood in detail, particularly advantageous embodiments thereof will be described with reference to the accompanying drawings, which form a part of this specification, and wherein:

FIG. 4 is a longitudinal sectional view of an extrusion die according to another embodiment.

Figure 1:
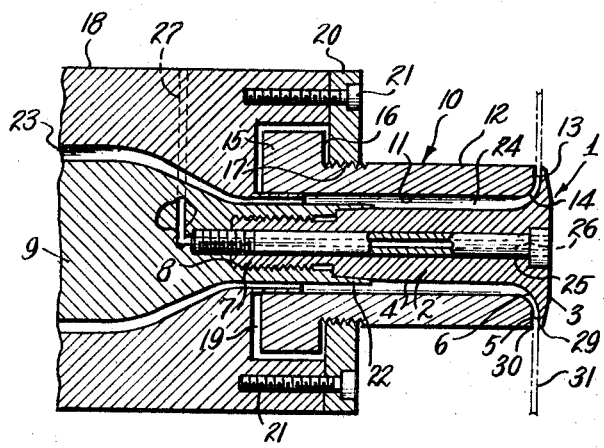
FIG. 1 is a longitudinal sectional view of an extrusion die constructed in accordance with the invention.
Figure 2:
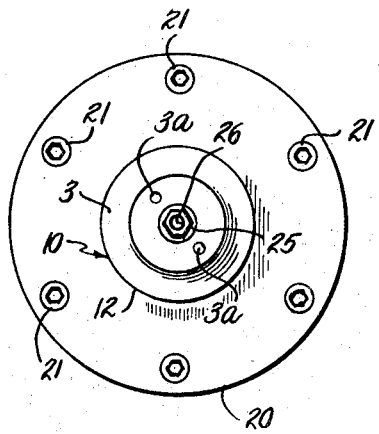
FIG. 2 is an end elevational view of the die of FIG. 1.

Referring to FIGS. 1 and 2, an extrusion die in accordance with one embodiment of the invention comprises a die mandrel 1 including on elongated cylindrical body portion 2 and a transversely enlarged nose portion 3. Body portion 2 presents a right cylindrical outer surface 4. Nose portion 3 is located at the forward end of the die body and includes a flat annular surface 5 which lies in a plane transverse to the longitudinal axis of the mandrel 1, faces toward the opposite end of the mandrel, and is joined to cylindrical surface 4 by an inwardly and rearwardly curving annular surface 6. At its opposite end, the body portion 2 of the mandrel is of reduced diameter at 7 and is suitably threaded, so that the mandrel can be secured in operative position by being screwed into a threaded axial bore 8 in a suitable central torpedo body member 9 of the die.

The die further comprises a tubular die body 10 having a right cylindrical inner surface 11 and a right cylindrical outer surface 12. At its forward end, body 10 presents a flat annular end surface 13 which is transverse with respect to the common longitudinal axis of surfaces 11 and 12 and which is joined to surface 12 by an inwardly and rearwardly curving annular surface 14. At its end opposite surface 13, the die body is provided with an integrally formed outwardly projecting cylindrical enlargement 15 presenting a transverse annular shoulder 16 directed toward the forward end of the die body. Threads are provided in a portion 17 of surface 12 adjacent shoulder 16.

An outer member 18 of the die surrounds support 9 and is provided at its forward end with an axially opening annular cavity 19 of such size and configuration as to freely accommodate the end portion of the die body including cylindrical enlargement 15. The die body is carried by a flat ring 20 having internal threads with which the threaded portion 17 of the die body is engaged, ring 20 being secured rigidly to member 18 as by screws 21. Cavity 19 is defined in part by a forwardly extending, thin-walled tubular projection 22 slidably engaged within the adjacent end portion of inner surface 11.

Parts 9 and 18 define a tubular passage 23 opening directly into the annular space 24 between inner surface 11 of the die body and outer surface 4 of the mandrel. Thus, heat-plastified polymeric material confined within the conventional working chamber (not shown) of the extrusion apparatus can be forced forwardly via passage 23 and space 24 into the transverse annular gap between the end surface 13 of the die body and surface 5 of the nose portion of the mandrel.

Mandrel 1 is further secured by an elongated screw 25 which extends through an axial bore in the mandrel, the threaded tip of screw 25 projecting rearwardly beyond the body portion of the mandrel and being engaged in a suitably threaded axial blind bore in the end of part 9. Screw 25 has a central through passage 26 communicating with a duct 27 leading transversely outwardly to a coupling (not shown) via which the combination of duct 27 and passage 26 is connected to the usual source of compressed air or other pressure fluid.

The exposed forward end face 28 of nose portion 3 of the mandrel is interrupted only by the axial bore accommodating screw 25, and includes a flat transverse central portion and an outer frusto-conical surface portion which tapers outwardly and rearwardly to the forward die lip 29. The rear die lip 30 is defined by the junction between end surface 13 and outer surface 12 of the die body. The die gap, that is, the axial space between lips 29 and 30, can be simply adjusted by rotation of the die body relative to ring 20, the threaded engagement between portion 13 and the threaded inner surface of ring 20 causing axial movement of the die body relative to the ring 20 and mandrel 1 in a direction depending on the direction of rotation of the die body.

Figure 3:
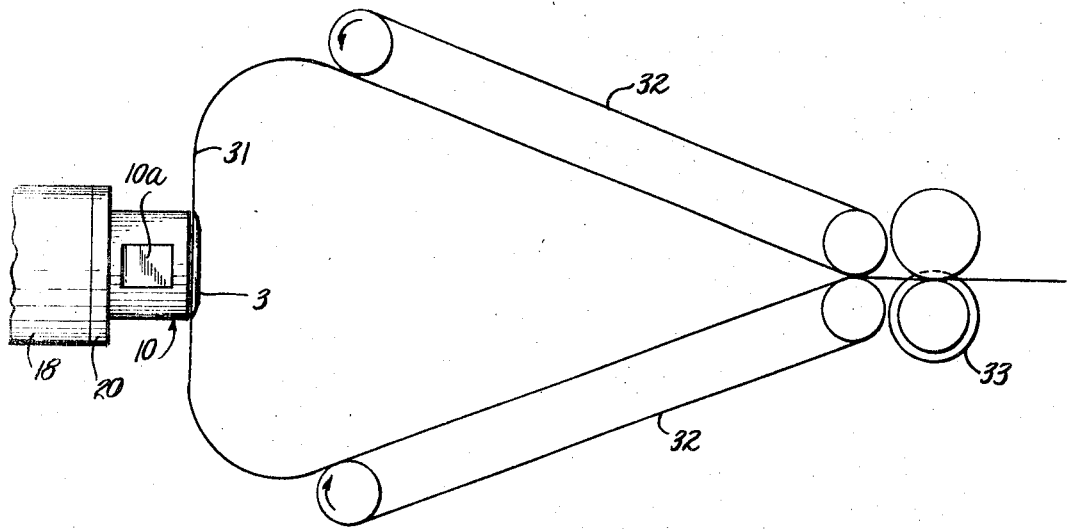
FIG. 3 is a semidiagrammatic view illustrating the manner in which the die of FIGS. 1 and 2 is employed.

In using the die just described, the die is mounted on a conventional extruder which is operated in the usual fashion to force heat-plastified polymeric material forwardly through passage 23 and space 24, then through the outwardly curving passage defined by surfaces 6 and 14, and finally transversely outwardly via the peripheral die orifice defined by lips 29 and 30. The extruded material, having cooled enough to be self-sustaining but still subject to plastic flow, commences as a flat sheet 31, FIG. 1. Referring now to FIG. 3, continuous operation is started by manually moving the emerging sheet 31 forwardly away from the die and between conventional converging flattening belts 32, and introducing fluid under pressure to the now-tubular product via passage 26 in screw 25 so that the extruded tubular product is expanded against the flattening belts. The belts 32 are driven continuously in directions tending to carry the extruded product away from the die, and therefore act to continuously flatten the extruded tube. As the tube emerges from between the downstream ends of belts 32, it passes through a pair of transversely spaced slitting devices 33 which trim the edges of the flattened tube and thus convert the same into two superimposed running webs which can be handled separately in any desired manner.

As will be clear from FIG. 3, once the extruded sheet 31 has been gathered and moved ahead of the die so as to be engaged between the flattening belts, the inflation which results from supplying pressure fluid via passage 26 not only urges the tubular product into engagement with the belts but also stretches the extruded material away from the peripheral die orifice in directions which are substantially radial and transverse relative to the longitudinal axis of the die. Such stretching occurs because the combined effect of inflation and of advancing of the extruded material by the flattening rolls (and such other haul-off devices as may be employed) causes the extruded sheet to be drawn transversely away from the die orifice at a rate which exceeds the rate of extrusion through the die. Since the still plastic material emerging from the die orifice does not contact the die lips, and in fact does not contact any solid object until engaged by the flattening belts after further cooling as a result of exposure to ambient air and the inflating pressure fluid, the surfaces of the extruded product remain smooth and uniform, free from the "die marks" which have been encountered in prior-art methods.

When the size of the die gap is to be set preparatory to start up, the mandrel 1 can be rotated relative to body 9 so that the cooperating threads at 7, 8 cause the mandrel to move forwardly or rearwardly, depending on the direction of rotation, with surface 5 being shifted correspondingly away from or toward surface 13. Such rotation of the mandrel can be accomplished by means of a suitable tool engaging forwardly opening recesses 3a, FIG. 2, in nose portion 3. When further adjustment of the die gap is to be made while extrusion is in process, body 10 is simply rotated relative to ring 20, so that surface 13 is shifted correspondingly toward or away from surface 5 by reason of the threaded engagement between body 10 and ring 20 at 17. To facilitate rotation of body 10, the body is provided with flats 10a, FIG. 3, for engagement by a suitable wrench.

Turning now to FIG. 4, the embodiment of the invention here illustrated comprises a throat member 40 and a spider member indicated generally at 41. The spider member comprises an outer ring 42, an inner rearwardly tapering conical torpedo portion 43, and spider arms 44 interconnecting ring 42 and torpedo portion 43. The torpedo portion of the die is completed by a torpedo body member 45. A fixed die ring 46 is secured to ring 42 and surrounds torpedo body member 45. An annular cylindrical portion 47, integral with the fixed die ring 46, projects forwardly from the fixed die ring and has an inner diameter markedly greater than the outer diameter of the forward end of torpedo body 45.

The cylindrical portion 47 of the fixed die ring cooperates with a flat annular clamping ring 48 and radial adjusting screws 49 to support in precisely adjusted position a floating die ring 50. Ring 50 includes a portion 51 of larger outer diameter and presenting a flat rear face 52 and a forwardly facing shoulder 53. Secured to the fixed die ring by screws 54, clamping ring 48 engages shoulder 53 of the floating die ring. A metal sealing gasket 55 is engaged in compression between the flat rear face 52 of the floating die ring and the adacent face of the fixed die ring.

Forwardly of portion 51, floating die ring 50 includes an intermediate portion having a right cylindrical outer surface 56 of slightly smaller diameter than the inner surface of clamping ring 48. The intermediate portion terminates forwardly in a shoulder 57, and the remainder of the outer surface of the floating die ring is threaded as indicated at 58. The floating die ring thus has an exteriorly threaded front end portion 59 terminating in a flat transverse annular front face 60. The front face 60 does not extend for the full width of portion 59, there being a tubular extension 61 made integral with the floating die ring and including a cylindrical outer surface and an annular inner surface which is of convex cross-sectional configuration.

The outer portion of the die assembly is completed by a tubular die body member indicated generally at 62 and having an internally threaded rear portion 63, the threads of this portion being engaged with the external threads at 58 presented by portions 59 of the floating die ring. Save for portion 63, body member 62 has an inner surface which is in the form of a right cylinder for most of its length, the diameter of this surface being such that the member closely embraces the cylindrical outer surface of the tubular extension 61 of body member 50. Body member 62 has a flat transverse annular front end surface 64 which is joined to the inner surface of the body member by a smoothly curving surface, as shown. The front end portion of body member 62 is cut away at diametrically opposite points to provide wrench flats indicated at 65.

A flat annular sealing ring 66 is provided between the main front end face 60 of the floating die ring 50 and the adjacent flat annular face 67 presented by the intermediate portion of die body member 62. Sealing ring 66 is resilient and compressible in a direction axially of the die structure and, as will be seen hereinafter, is provided to seal between surfaces 60 and 67 for all adjusted operational positions of the die body member 62. Typically, sealing ring 66 is of polytetrafluoroethylene and of a thickness significantly greater than the total range of die gap adjustment desired.

The die structure is completed by a mandrel indicated generally at 68 and comprising an elongated mandrel body 69 exteriorly threaded at its rear end for screw-thread engagement with interior threads on the front portion of spider member 41. The nose portion 70 of the mandrel is provided with a transverse annular outwardly projecting flange 71 constituting the fixed die lip. The rearwardly facing surface of flange 71 includes a flat transverse annular portion 72 disposed parallel to and beside the front end surface 64 of adjustable die body member 62. Surface portion 72 is joined to a right cylindrical outer surface portion 73 of the mandrel body and the remainder of the outer surface portion of the mandrel body has a configuration complementary to the configuration of the surrounding surface of the floating die ring. An annular filler block 75 completely fills the space between shoulder 74 and the front end of the torpedo body member 45, thus completing the inner surface of the annular passage which leads to the die gap defined by surfaces 72 and 64.

From the foregoing, it will be clear that the adjustable die member 62 can be rotated in a direction which will cause the same to move toward flange 71, and so decrease the die gap, such movement resulting from the interengagement of the threads at 58. Conversely, member 62 can be rotated in the opposite direction so as to move axially away from flange 71, so increasing the die gap. When the adjustable die body member 62 is moved in the first direction, the resilience of sealing ring 66 causes the thickness of the sealing ring to increase so that a seal is maintained between the floating die ring and the adjustable die body member despite the fact that the die body member has been moved axially forwardly. Similarly, movement of the adjustable die member in the opposite direction serves only to further increase the compression of sealing ring 66 and the seal is accordingly maintained.

While particularly advantageous embodiments of the invention have been chosen for illustrative purposes, it will be understood by those skilled in the art that various changes and modifications can be made therein without departing from the scope of the invention as defined in the appended claims.

What is claimed is:

1. In an extrusion die for polymeric material, the combination of
   elongated adjustable die body means having
      a cylindrical through passage,
      a transverse annular front end surface, and
      a threaded cylindrical surface portion spaced rearwardly from said front end surface;
   fixed outer die body means comprising
      a threaded cylindrical surface portion adapted to mate with said threaded surface portion of said adjustable die body means, said threaded portions being interengaged to mount said adjustable die body means on said fixed die body means and to afford axial adjustment of said adjustable die body means when the same is rotated relative to said fixed die body means, and
      a thin forwardly projecting tubular extension having a cylindrical outer surface disposed in flush engagement with the wall of the rear end portion of said through passage of said adjustable die body means;
   fixed inner die body means rigidly secured within said fixed outer die body means; and
   mandrel means comprising
      an elongated cylindrical body portion disposed concentrically within said through passage of said adjustable die body means and spaced inwardly from the wall of said through passage, and
      a transversely enlarged nose portion having an annular surface extending transversely outwardly relative to said body portion,
      said mandrel means being fixed to said inner die body means and extending forwardly completely through said adjustable die body means, with said annular surface of said nose portion facing said annular front end surface of said adjustable die body means and being spaced therefrom so that said annular surface of said nose portion and said front end surface cooperate to define an annular die orifice which opens transversely outwardly;
   the outer surface of said body portion of said mandrel means and the portion of the wall of said through passage located forwardly of said tubular extension cooperating to define a straight uninterrupted cylindrical tubular passage which extends forwardly substantially to said front end surface of said adjustable die body means, the transverse cross-sectional area of said tubular passage remaining essentially unchanged when the axial position of said adjustable die body means is adjusted by rotation of the same relative to said fixed outer die body means;
   said adjustable die body means being laterally exposed for rotational adjustment during extrusion of polymeric material through the die;
   rotation of said adjustable die body means relative to said fixed outer die body means being effective, by reason of interengagement of said threaded surface portions to adjust the space between said front end surface of said adjustable die body means and said annular surface of said nose portion;

said fixed outer die body means and said fixed inner die body means cooperating to define annular passage means via which polymeric material can be supplied forwardly to said tubular passage.

2. The combination defined in claim 1, wherein said fixed outer die body means comprises an annular member having a forwardly projecting exteriorly threaded portion having a transverse annular front face,
   said thin tubular extension projecting forwardly from the inner periphery of said front face; and
said adjustable die body means is a tubular member having a rear portion with an internal diameter larger than the diameter of said through passage, said larger diameter rear portion being threaded to mate with said exteriorly threaded portion of said outer die body means,
said larger diameter rear portion and said through passage being joined by a transverse annular rearwardly directed shoulder;

the combination further including
   resiliently compressible sealing means engaged in compression between said front face of said forwardly projecting portion of said fixed outer die body means and said rearwardly directed shoulder of said tubular member.

References Cited
UNITED STATES PATENTS

| | | | |
|---|---|---|---|
| 2,952,872 | 9/1960 | Buteux et al. | 18—14 |
| 3,281,896 | 11/1966 | Meyer et al. | 18—14 |
| 3,349,435 | 10/1967 | Bosch | 18—14 |
| 3,357,050 | 12/1967 | Criss | 18—14 |
| 3,378,614 | 4/1968 | Overcashier. | |

WILLIAM J. STEPHENSON, Primary Examiner